United States Patent [19]
Westeppe et al.

[11] Patent Number: 4,985,486
[45] Date of Patent: Jan. 15, 1991

[54] REINFORCED/FILLED BLENDS OF THERMOPLASTIC INTERPOLYMERS AND POLYAMIDES AND A PROCESS FOR THEIR PRODUCTION

[75] Inventors: Uwe Westeppe, Mettmann; Christian Lindner, Cologne; Karl-Erwin Piejko, Bergisch-Gladbach; Hans-Joachim Laue, Cologne, all of Fed. Rep. of Germany

[73] Assignee: Bayer Aktiengesellschaft, Leverkusen, Fed. Rep. of Germany

[21] Appl. No.: 389,758

[22] Filed: Aug. 3, 1989

[30] Foreign Application Priority Data

Aug. 16, 1988 [DE] Fed. Rep. of Germany ....... 3827668

[51] Int. Cl.$^5$ .......................... C08K 3/10; C08K 3/26; C08K 3/34; C08L 33/34
[52] U.S. Cl. .................................... 524/514; 524/504; 524/522; 524/523; 524/525; 524/526; 524/447; 524/451; 524/425; 524/456; 524/430; 524/431; 524/452

[58] Field of Search ................ 524/514, 504; 525/178, 525/179, 66

[56] References Cited

U.S. PATENT DOCUMENTS

| | | |
|---|---|---|
| 4,495,324 | 1/1985 | Chacko et al. ...................... 524/514 |
| 4,501,844 | 2/1985 | Chen et al. .......................... 524/451 |
| 4,684,696 | 8/1987 | Bates et al. ........................... 525/68 |

Primary Examiner—Lewis T. Jacobs
Assistant Examiner—Edward J. Webman
Attorney, Agent, or Firm—Connolly and Hutz

[57] ABSTRACT

The invention relates to thermoplastic molding compounds of reinforced (for example with glass fibers) and/or filled (for example with kaolin) polyamides, interpolymers having a certain chemical composition (of polyamides and thermoplastic copolymers) and, optionally, a rubber modifier which increases the toughness of the molding compounds, and to a process for their production.

16 Claims, No Drawings

REINFORCED/FILLED BLENDS OF THERMOPLASTIC INTERPOLYMERS AND POLYAMIDES AND A PROCESS FOR THEIR PRODUCTION

This invention relates to thermoplastic molding compounds of reinforced (for example with glass fibers) and/or filled (for example with kaolin) polyamides, interpolymers having a certain chemical composition (of polyamides and thermoplastic copolymers) and, optionally, a rubber modifier which increases the toughness of the molding compounds, and to a process for their production.

JA No. 62/149 749 describes blends of polyamide, a styrene polymer, inorganic filler and a thermoplastic, elastomeric copolymer containing —COO-groups. JA No. 63/015 845 describes molding compounds of 10 to 85% by weight polyamide, 10 to 60% by weight filler and 3 to 30% by weight of a block/graft polymer of aromatic vinyl compounds and conjugated dienes.

Applicants' own unpublished German patent application No. P 37 09 599.4 (Le A 24 976) claims molding compounds of a thermoplastic polyamide, a thermoplastic resin copolymer and, optionally, a rubber polymer which increases the impact strength of the molding compound. In addition, the molding compounds may contain fillers and reinforcing materials (cf. page 18). If compounds are produced from the educts mentioned in LeA 24 976 and glass fibers, discoloration is seen to affect the molding compounds which, in addition, show distinctly reduced toughness compared with glass-fiber-modified polyamide (cf. Comparison Tests).

Accordingly, the technical problem addressed by the present invention is to provide thermoplastic molding compounds which are improved in regard to color and toughness, but which still show the favourable properties (smooth surfaces, reduced water uptake, high rigidity and toughness) of the molding compounds described in P 37 09 599.4 (Le A 24 976).

According to the invention, this object is achieved by mixing interpolymers having a certain chemical composition with reinforced and/or filled polyamide and processing the resulting thermoplastic mixtures to form moldings. In one preferred embodiment of the invention, the two components are mixed in granulate form and the resulting mixed granulate extruded to moldings.

The interpolymers are described in German patent application No. P 3827669.0 (Le A 25 958) filed at the same time as the present application.

The interpolymers (D) are combination products of polyamides (A) and copolymers (B) with copolymerized monomers containing tertiary ester groups which can no longer be separated into the pure components (A) and (B) (educts) by physical methods, such as fractionation with solvents, etc., i.e. at least partially chemical links exist between components (A) and (B) (so-called interpolymer formation).

The present invention relates to filled and/or reinforced thermoplastic molding compounds having an improved surface and improved mechanical or electrical properties which comprise of
(AE) at least 10% by weight, preferably at least 20% by weight and more preferably from 25 to 75% by weight polyamide (A) which contains from 10 to 65% by weight and preferably from 15 to 60% by weight, based on polyamide (A), of fillers and/or reinforcing materials (E),
(D) from 10 to 60% by weight and preferably from 20 to 60% by weight interpolymers and
(C) from 0 to 30% by weight, preferably from 5 to 20% by weight and more preferably from 5 to 15% by weight, based on the sum of (A +C +D), of rubber polymers as impact modifiers,
the interpolymers (D) consisting of
from 40 to 80% by weight and preferably from 50 to 75% by weight of partially crystalline and/or amorphous polyamides (A) and
(B) from 20 to 60% by weight and preferably from 25 to 50% by weight of thermoplastic copolymers or mixtures of several thermoplastic copolymers of
(B1) at least 15% by weight, preferably at least 30% by weight and, more preferably, at least 45% by weight of at least one monomer from the group consisting of
(B1.1) styrenes and α-methylstyrenes which may also be alkyl-, haloalkyl- and/or halogen-substituted
and, optionally,
(B1.2) from 0 to 50% by weight, preferably from 10 to 50% by weight and more preferably from 20 to 40% by weight of other monomers from the group consisting of acrylonitrile, methacrylonitrile, vinyl-$C_{1-4}$-carboxylic acids and esters of acrylic or methacrylic acids with primary or secondary $C_{1-10}$ alcohols,
and
(B2) from 0.5 to 35% by weight, preferably from 1 to 20% by weight and more preferably from 1.5 to 15% by weight of at least one ester of acrylic or methacrylic acid with tertiary $C_{4-10}$ alcohols,
prepared by homogenization of components (A) and (B) in the melt in standard mixing or kneading units at temperatures above the melting point of the higher-melting component until the interpolymers are formed.

The interpolymers (D) are prepared by homogenization of its components in the melt at temperatures above the melting point of the higher-melting component, for example in standard mixing or kneading units, such as extruders, Banbury mixers or the like, the formation of the interpolymers (D) taking place during mixing by chemical linking of components (A) and (B). The exact structure of the products formed is still not known at present. However, polymeranalytical investigations have shown that interpolymers are present because they can no longer be separated into their starting products. The average residence time in the melt up to formation of the interpolymers can be shorter, the higher the melting temperature. The average residence time is at least 0.5 minute and preferably between 1 and 3 minutes. The melting temperature above the melting temperature of the higher-melting component is generally limited by that temperature at which significant degradation phenomena occur. The residence time is determined not only by the apparatus used but also by the homogeneity of mixing and by adequate interpolymer formation. The minimum residence time generally decreases with increasing content of component (B2) in the copolymer B.

Polyamides A

The polyamide component (A) of the interpolymers (D) or molding compounds according to the invention may consist of any partially crystalline polyamides, particularly polyamide-6, polyamide-6,6, and partially crystalline copolyamides based on these two components. Also suitable are partially crystalline polyamides of which the acid component consists in particular completely or partly (besides adipic acid or caprolactam) of terephthalic acid and/or isophthalic acid and/or suberic acid and/or sebacic acid and/or azelaic acid and/or dodecane dicarboxylic acid and/or adipic acid and/or a cyclohexane dicarboxylic acid and of which the diamine component consists completely or partly of, in particular, m- and/or p-xylylenediamine and/or hexamethylenediamine and/or 2,2,4- and/or 2,4,4-trimethyl hexamethylenediamine and/or isophoronediamine and/or tetramethylendiamine and of which the compositions are known from the prior art.

Other suitable partially crystalline polyamides are those which have been produced completely or partly from lactams containing 6 to 12 C atoms in the ring, optionally using one or more of the starting components mentioned above.

Particularly preferred partially crystalline polyamides (A) are polyamide-6 and polyamide-6,6 or copolyamides containing only small amounts (up to about 10% by weight) of the co-components.

Amorphous polyamides may also be used as the polyamide component (A). They are obtained by polycondensation of diamines, for example ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, or mixtures of 4,4'- and/or 2,2'diaminodicyclohexylmethanes, 2,2-bis-(4-aminocyclohexyl)-propane, 3,3'-dimethyl-4,4'-diaminodicyclohexylmethane, 3-aminoethyl-3,5,5-trimethyl cyclohexylamine, 2,5- and/or 2,6-bis-(aminomethyl)-norbornane and/or 1,4-diaminomethyl cyclohexane, with dicarboxylic acids, for example oxalic acid, adipic acid, azelaic acid, decanedicarboxylic acid, heptadecanedicarboxylic acid, 2,2,4- and/or 2,4,4-trimethyl adipic acid, isophthalic acid or small quantities of terephthalic acid. Amorphous copolymers obtained by polycondensation of several monomers are of course also suitable as are copolymers which have been prepared with addition of aminocarboxylic acids, such as ω-aminocaproic acid, ω-aminoundecanoic acid or ω-aminolauric acid or lactams thereof.

Particularly suitable amorphous polyamides are the polyamides prepared from isophthalic acid, hexamethylenediamine and other diamines, such as 4,4'-diaminodicyclohexylmethane, isophoronediamine, 2,2,4- and/or 2,4,4-trimethyl hexamethylenediamine, 2,5- and/or 2,6-bis-(aminomethyl)-norbornane; or from isophthalic acid, 4,4'-diaminodicyclohexylmethane and ω-caprolactam; or of isophthalic acid, 3,3'-dimethyl-4,4'-diaminodicyclohexylmethane and lauric lactam; or from terephthalic acid and the isomer mixture of 2,2,4- and/or 2,4,4-trimethyl hexamethylenediamine.

Instead of using pure 4,4'-diaminodicyclohexylmethane, it is also possible to use mixtures of the position-isomeric diaminodicyclohexylmethanes which consists of 70 to 99 mol-% of the 4,4'-diamino isomer,
1 to 30 mol-% of the 2,4'-diamino isomer,
0 to 2 mol-% of the 2,2'-diamino isomer
and, optionally, correspondingly more highly condensed diamines obtained by hydrogenation of technical diaminodiphenylmethane.

The polyamides (A) may also consist of mixtures of partially crystalline and amorphous polyamides, the amorphous polyamide component preferably being smaller than the partially crystalline polyamide component.

Partially crystalline polyamides based on polyamide-6, polyamide 6,6 and partially crystalline polyamides based on these main components with addition of co-components of the type mentioned are preferred.

The polyamides (A) should preferably have a relative viscosity (as measured on a 1% by weight solution in m-cresol at 25° C.) in the range from 2.0 to 5.0 and preferably in the range from 2.5 to 4.0.

Fillers and/or reinforcing materials (E)

Suitable inorganic fillers and/or reinforcing materials (E) for the polyamides A are any of a number of known materials varying in their chemical composition and in their particle shape and geometry.

Thus, the particles may be predominantly in the form of spheres, cubes, squares, platelets and, in particular, fibers. A review of such particles can be found in Kunststoffe 73, 511 et seq (1983).

According to their chemical nature, the inorganic reinforcing materials are predominantly carbonates, preferably $CaCO_3$ (chalk, dolomite, calcite, amolite), silicates (asbestos, kaolin, talcum, mica, quartz, wollastonite) or metal oxide (aluminium oxide/aluminium hydroxide, alumina), although they may even be metal powders (for example aluminium, steel, copper).

The particle size of the reinforcing materials is variable within wide limits. The inorganic reinforcing materials may be aftertreated, for example to obtain better adhesion to the polyamide matrix.

The above-mentioned representatives of the inorganic reinforcing materials may be present in the reinforced polyamides either individually or in combinations of several.

It is particularly preferred to use glass fibers, glass beads (solid and hollow beads), chalk, kaolin, talcum and/or wollastonite.

(E) may preferably be incorporated in the polyamides A in a single operation.

The quantity of (E) is generally between 3 and 60% by weight, preferably between 10 and 60% by weight and more preferably between 15 and 50% by weight.

Thermoplastic copolymers (B)

Thermoplastic copolymers (B), which are reacted with the polyamides (A) in accordance with the invention to form the interpolymers (D), are copolymers of
(B1) at least one monomer from the group consisting of styrenes, α-methylstyrenes, acrylonitrile, methacrylonitrile, vinyl-$C_{1-4}$-carboxylic acids, esters of acrylic or methacrylic acid with primary or secondary $C_{1-10}$ alcohols; styrenes or α-methylstyrenes preferably being present as the monomer(s) (B1),
and
(B2) at least one ester of acrylic or methacrylic acid with tertiary $C_{4-10}$ alcohols in quantities of 0.5 to 35% by weight (B2) in the copolymer (B).

Preferred monomers (B1) as structural elements of the copolymers (B) are styrene, α-methylstyrene on the one hand and, as further monomers, acrylonitrile, methyl methacrylate, n-butyl methacrylate, cyclohexyl methacrylate and vinylacetate; styrene, α-methylstyrene and also acrylonitrile and methyl methacrylate being particularly preferred. The styrenes and α-methylstyrenes may be alkyl-, haloalkyl- or halogen-substituted on the aromatic ring; for example they may be substituted by $C_{1-3}$ alkyl groups, by halogen-containing ($C_{1-3}$) alkyl groups and/or by halogen atoms, although styrene and α-methylstyrene are preferred.

Monomers (B2) in the context of the invention are tertiary (meth)acrylates and have the following general formula

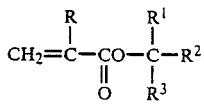

in which R=H, CH$_3$ and R$^1$, R$^2$ and R$^3$=alkyl, so that the sum of the C atoms in R$^1$, R$^2$ and R$^3$ is from 3 to 9.

Particularly preferred monomers (B2) are tert.-butyl acrylate, tert.-butyl methacrylate, tert.-pentylmethacrylate and tert.-hexylacrylate and, optionally, tert.-octyl (meth)acrylates.

The copolymers (B) are copolymers of at least two different monomers. They may also be used in the form of mixtures. Components (B) particularly suitable for the purposes of the invention consist of at least two different monomers (B1) and at least one monomer (B2), such as for example terpolymers of two components (B1), such as for example α-methylstyrene, styrene, methyl methacrylate and acrylonitrile, in combination with tert.-butyl (meth)acrylate as monomer component (B2).

The copolymers (B) contain up to 35% by weight (effectively 0.5 to 35% by weight), preferably up to 20% by weight, more preferably from 1 to 20% by weight and most preferably from 1.5 to 15% by weight of (B2).

In a particularly advantageous embodiment, component (B) consists of terpolymers of styrene/acrylonitrile/tert.-butyl(meth)acrylate, α-methylstyrene/acrylonitrile/tert.-butyl(meth)acrylate and, in particular, of terpolymers of styrene/acrylonitrile/tert.-butyl(meth)acrylate in which the terpolymer consists of 35 to 89% by weight and preferably 45 to 78.5% by weight styrene and/or α-methylstyrene, 10 to 50% by weight and preferably 20 to 45% by weight acrylonitrile and 1 to 15% by weight and preferably 1.5 to 10% by weight tert.-butyl (meth)acrylate (percentages by weight, based on the sum of components (B).

The polymers (B) may be prepared in known manner by copolymerization in solution, bulk, suspension, dispersion and emulsion and by radical or thermal polymerization processes.

Copolymers (B) particularly suitable for the purposes of the invention may be produced by aqueous emulsion polymerization. The monomers (B1) and (B2) are copolymerized advantageously using anionic emulsifiers. Particularly suitable resins (B) are obtained when polymerization is carried out with anionic emulsifiers of the carboxylic acid salt type, including for example salts of oleic acid, stearic acid, resinic acid, abietic acid and disproportionated derivatives thereof. To produce the resins, these emulsifiers are used in the usual quantities, preferably in quantities of up to 3% by weight, based on the sum of monomers (B1) and (B2).

The polymerization to (B) normally takes place at a temperature above 50° C. and, more especially, at a temperature in the range from 60° to 100° C. and may be carried out in batches, semi-continuously or fully continuously.

The copolymerization is initiated by heat or by radical formers, such as for example persulfate, perphosphate, hydroperoxide, azo compounds and, optionally, even by so-called redox initiators. Inorganic water-soluble initiators are particularly suitable.

The molecular weight of the copolymers (B) may be varied in known manner by various measures including, for example, temperature, monomer concentration, quantity of initiator or by the use of so-called regulators such as, for example, organosulfur compounds, such as mercaptans and disulfides, long-chain mercaptans, for example n- and tert.-dodecylmercaptan, being advantageous. The regulators are normally dissolved in the monomer mixture and the mixture subsequently polymerized.

Particularly advantageous interpolymers according to the invention are obtained when (B) has certain molecular weights, i.e. the intrinsic viscosities ($\eta$), as measured in dl/g at room temperature in DMF, preferably in the range from 0.2 to 2 and more preferably in the range from 0.3 to 1.5.

Component (C) (impact modifiers)

The molding compounds according to the invention may optionally contain as a further component a rubber polymer which increases the impact strength of the molding compounds (component C).

Preferred molding compounds contain up to 30% by weight, for example from 1 to 20% by weight and preferably from 5 to 15% by weight of component (C), based on the sum of (A)+(C)+(D). Component (C) is a rubber polymer and contains, or is, a rubber polymer having glass temperatures below 0° C. and more especially below −20° C. It may be selected from the group consisting of homopolymers, copolymers or graft polymers based on diene monomer, olefin or acrylate rubbers which may be uncrosslinked and, in particular, partially crosslinked or highly crosslinked. Component (C) should be selected from the rubber polymers known per se which are normally used for improving the properties of thermoplastic polyamides, particularly their impact strength.

Typical representatives of this class are, for example, olefin rubbers, for example diene rubbers, and also ethylene-propylene copolymers in which small quantities of unconjugated diene monomers may be incorporated (so-called EPDM rubbers), and also diene monomer/acrylonitrile copolymer rubbers, diene polymer/vinylaryl polymer block polymers, such as styrene/butadiene block copolymers.

Other suitable components (C) may be olefin rubbers containing acidic groups. However, it may be of greater advantage to use carboxyl-containing terpolymers of ethylene, (meth)acrylic acid and butylacrylate.

According to the invention, rubber-like copolymers of ethylene/vinylacetate and ethylene/alkyl(meth)acrylate copolymers may also be suitable as component (C). The ethylene copolymers with aminoacrylate monomers described in GB-P No. 1,284,489 are also suitable as component (C). It is also possible to use interpolymers of olefins, acrylate and acid-functional or latently acid-functional monomers, such as for example, (meth)acrylic acid or maleic anhydride.

Particularly suitable components (C) for the purposes of the invention are rubber-like graft polymers, for example graft polymers of α-olefin polymers and carboxylic acid and/or ester graft monomers, copolymers or homopolymers of ethylene, propylene and 1-butene being suitable as graft bases. Other suitable graft polymers are the poly-α-olefin rubber/maleic anhydride adducts known from patent applications DE-A No. 2 622 876, EP-B No. 13 941, DE-A No. 2 622 973, DE-A No. 2 401 149 and EP-B No. 9757, the reaction products of ethylene copolymers with maleic anhydride and dialkyl esters of maleic or fumaric acid known from DE-A No. 3 335 706, the polyolefin rubbers (GB-P No. 998,439) grafted with unsaturated acids according to FR-P No. 1 568 637 and the maleic-acid-grafted EPDM rubbers described, for example, in DE-A No. 2 622 973.

Graft polymers formed by the grafting of styrene monomers and acrylonitrile onto a rubber polymer having a glass temperature below 0° C. and preferably below −20° C. are also particularly suitable. In this case, rubber polymers are, for example, polybutadiene, butadiene-acrylate copolymers, for example based on butyl and/or ethylhexylacrylate, polyalkylacrylates, particularly those containing 1 to 8 carbon atoms in the alkyl radical, copolymers of butadiene, alkylacrylates and vinylalkyl ethers, copolymers of ethylene, propylene and a diene component. The production of rubber-modified copolymers such as these is known (for example from JA No. 48 850 or U.S. Pat. No. 4,217,424).

The graft polymers of styrene and acrylonitrile on polybutadiene or copolymers of butadiene and $\alpha,\beta$-unsaturated monomers, such as for example styrene, acrylonitrile, lower alkyl esters of acrylic or methacrylic acid, known from DE-A No. 2 906 222 and the known grafted acrylate rubbers are also suitable as component (C).

Other particularly suitable components (C) are the multiphase polymers described for example in DE-A No. 3 200 070 of a highly crosslinked diene rubber as core, a first shell of crosslinked acrylate rubber (core/-shell rubber) and a second shell of a polymer or copolymer of resin-forming monomers from the group consisting of styrene, acrylonitrile, methacrylonitrile, methacrylates or mixtures thereof.

The grafted, partially crosslinked diene and/or acrylate rubbers described in EP-A No. 0 134 937 and the graft products produced in accordance with DE-A No. 2 758 615 from a crosslinked rubber as graft base are also suitable. Rubbers based on polybutadiene and/or polyisoprene, which may contain up to 40% by weight and preferably up to 10% by weight styrene and/or acrylonitrile and/or acrylates as comonomer are preferred. Possible graft monomers may be acrylonitrile, methacrylonitrile, aliphatic esters and amides of acrylic acid and methacrylic acid containing up to 22 C atoms.

Preferred monomers grafted onto the rubber bases are alkyl methacrylate, styrene, acrylonitrile, alkyl acrylate, acrylamides, acrylic acid, methacrylic acid, particularly methyl methacrylate, and combinations of methyl methacrylate and alkylacrylates, optionally containing small quantities (0.2 to 5% by weight) of unsaturated carboxylic acids, such as (meth)acrylic acid.

The molding compounds according to the invention may contain standard additives, such as lubricants and mold release agents, nucleating agents, stabilizers, flameproofing agents, dyes and also heat stabilizers, antioxidants and/or light stabilizers in standard effective quantities.

The molding compounds may be produced by mixing of the components (preferably in the form of granulates) in standard mixing machines, such as mixing rolls, kneaders, single-screw or multiple-screw extruders.

Hitherto unpublished patent application No. P 37 09 599.4 (Le A 24 976) describes blends of polyamides (A), tertiary esters of certain polymers (component B) and, optionally, high-impact modifiers (C) containing fillers and reinforcing materials. Compared with this proposal, the present invention comprises mixing the polyamide component (A) containing fillers and/or reinforcing materials (E) with a preformed interpolymer (D) and, optionally, a rubber component (C) and molding the resulting mixture. In one preferred embodiment, the mixture of components (A), (D) and, optionally, (C) is thoroughly homogenized and immediately extruded to moldings without further compounding. The moldings produced by this particularly preferred embodiment of the process according to the invention are distinguished in particular by very good strength values and good electrical properties.

The temperature at which the mixtures are prepared should be at least 10° C. and best at most 80° C. above the highest melting point or softening point of components A, B or C. Commensurate with their property spectrum, the molding compounds according to the invention may be used anywhere in the injection molding or extrusion field where the described properties are required, for example as a housing material for electrical appliances and in the automotive field for hub caps.

EXAMPLES

Components used

A. Polyamide

A1. Polyamide 6 having a relative viscosity (as measured on a 1% by weight solution in m-cresol at 25° C.) of 3.0

A2. Polyamide 6 having a relative viscosity (as measured on a 1% by weight solution in m-cresol at 25° C.) of 3.0 and a glass fiber content of 50% by weight B. Thermoplastic resin polymers (component B)

COMPARISON EXAMPLE B/A

A solution of 3723 g water, 83 parts by weight of the Na salt of disproportionated abietic acid and 43 parts by weight 1 N sodium hydroxide is introduced into a 10 liter stirred vessel. After the air has been displaced by nitrogen and the internal temperature adjusted to 75° C., 7 parts by weight potassium peroxodisulfate and 358 parts by weight water are added. 1610 Parts by weight α-methylstyrene, 723 parts by weight acrylonitrile and 2 parts by weight t-dodecylmercaptan are then added over a period of 6 h at 75° C. Immediately after the end of the addition, 1.2 g potassium peroxodisulfate dissolved in 46.7 g water are added, followed by stirring for another 4 h at 75° C.

The α-methylstyrene/acrylonitrile copolymer latex obtained is stabilized by addition of 1.2% by weight, based on polymer solids, of phenolic antioxidants. The latex is then coagulated with an aqueous solution of MgSO₄ (Epsom salt) and acetic acid at 85° to 95° C. and at pH 4 to 5, filtered, washed until free from electrolyte and dried at 60° C.

EXAMPLES B1 to B3

Water, the sodium salt of disproportionated abietic acid and 1 N NaOH are introduced into a 10 liter stirred vessel in the quantities shown in Table 1. After the air has been displaced by nitrogen, followed by heating to 75° C., α-methylstyrene, acrylonitrile, t-butylacrylate and d-dodecylmercaptan are added in the quantities shown over a period of 6 h at 75° C. After the end of the addition, 1 2 g potassium peroxodisulfate dissolved in 46.7 g water are immediately added, followed by stirring for another 4 h at 75° C.

The terpolymer lattices obtained are stabilized by addition of 1.2% by weight, based on polymer solids, of phenolic antioxidants. The lattices are then coagulated with an aqueous solution of MgSO₄ (Epsom salt) and acetic acid at 85° to 95° C. and at pH 4 to 5, filtered, washed until free from electrolyte and dried at 60° C.

extruder and the melt is homogenized at 265°–270° C. (residence time 2.5 minutes).

The granular resulting from spinning the melt mixture to wires into water, and dropping into granules, are dried as usually.

TABLE 1

Production of the thermoplactic resin polymers (B) based on α-methylstyrene/acrylonitrile/t-butylacrylate used in accordance with the invention to form the interpolymers (D)

| Examples | | Comparison Example BA | B1 | B2 | B3 |
|---|---|---|---|---|---|
| Initial phase | | | | | |
| Water | parts by weight | 3,723 | 3,723 | 3,723 | 3,723 |
| Emulsifier* | parts by weight | 83 | 83 | 83 | 83 |
| 1 N NaOH | parts by weight | 42 | 43 | 43 | 43 |
| Potassium peroxodisulfate | parts by weight | 7 | 7 | 7 | 7 |
| Water | parts by weight | 358 | 358 | 358 | 358 |
| Inflow phase | | | | | |
| α-Methylstyrene | parts by weight | 1,610 | 1,575 | 1,540 | 1,540 |
| Acrylonitrile | parts by weight | 723 | 723 | 723 | 653 |
| t-Butylacrylate | parts by weight | — | 35 | 70 | 140 |
| t-Dodecylmercaptan | parts by weight | 2 | 2 | 2 | 2 |
| Further addition | | | | | |
| Potassium peroxodisulfate | parts by weight | 1.2 | 1.2 | 1.2 | 1.2 |
| Water | parts by weight | 46.7 | 46.7 | 46.7 | 46.7 |
| % by weight tert.-butylacrylat | | 0 | 1.5 | 3 | 6 |

*Na salt of disproportionated abietic acid

Examples of rubber polymers (component C) suitable for use in accordance with the invention

EXAMPLE C1

To produce the rubber polymer (C1), 20 parts by weight methylmethacrylate are grafted onto 80 parts by weight of a coarse-particle rubber (mean particle diameter of the acrylate graft base present in latex form: 0.5 μm) by emulsion polymerization in accordance with EP No. 0 134 937. The latex is then coagulated and another 14.3 parts by weight methylmethacrylate grafted on.

EXAMPLE C2

An EPM rubber (Exxelor VA 1803, an Esso product) grafted with approximately 0.70% maleic anhydride was used.

(D) Interpolymers

Preparation of Interpolymer D1

In a proportion of 50 parts by weight of polyamide A1 and 50 parts by weight of copolymer B2 are transferred to a melt in a continuously working two-shaft extruder and are homogenized in the extruder (residence time about 2.5 minutes) at temperature of 265°–270° C.

After granulation the granulate is dried.
Preparation of Interpolymer D2

In a proportion of 50 parts by weight of polyamide A1 and 50 parts by weight of copolymer B3 are transferred to a melt in a continuously working two-shaft Examples of the fillers and reinforcing materials (E) used (E1) Glass fibers (Silenka ®8041) (E2) Kaolin B.1 Production and testing of molding compounds 1-9 (comparison)

The polyamide component (A), the thermoplastic resin copolymer (B) and, optionally, the rubber C are fused in a continuous-action twin-screw extruder, after which component (E) is added and homogenized in the melt. The cylinder temperatures were selected so that the melt temperatures were maintained. The melt strand was degassed before leaving the die, passed through water, granulated and dried.

B.2

To produce test bars from compounds 10 to 13 (according to the invention), components (A), (D) and, optionally, (C) were mixed (in the form of granulates) and extruded under the same conditions as in B.1. Where component (D) is used, uniform smoothing out is observed. The injection-molded test bars have smooth surfaces.

Test bars measuring 80×10×4 mm were produced from the molding compounds in a standard injection-molding machine and were used to determine elasticity modulus in bending (DIN 53457), softening point (Vicat B) (DIN 53460), Izod impact strength (ISO 180) at room temperature and dielectric strength in accordance with VDE 0303, Part 3.

For conditioning, the test specimens were left for 32 h in a tropical climate (40° C./95% relative humidity) and then stored for four weeks at room temperature (equalizing storage).

| | PA A | | Resin polymer B | | Rubber polymer C | | Interpolymer D | | Filler or reinforcing materials E | |
|---|---|---|---|---|---|---|---|---|---|---|
| | type | % by weight | type | % by weight | type | % by weight | type | % by weight | type | % by weight |
| Comparison | | | | | | | | | | |
| 1 | A1 | 70 | — | — | — | — | — | — | E1 | 30 |

-continued

| | | | | | | | | | | |
|---|---|---|---|---|---|---|---|---|---|---|
| 2 | | A1 | 70 | — | — | — | — | — | — | E2 | 30 |
| 3 | | A1 | 50 | BA | 20 | — | — | — | — | E1 | 30 |
| 4 | P 37 09 599.4 | A1 | 50 | B1 | 20 | — | — | — | — | E1 | 30 |
| 5 | P 37 09 599.4 | A1 | 50 | B3 | 20 | — | — | — | — | E1 | 30 |
| 6 | P 37 09 599.4 | A1 | 50 | B3 | 20 | — | — | — | — | E1 | 30 |
| 7 | P 37 09 599.4 | A1 | 50 | B3 | 20 | — | — | — | — | E2 | 30 |
| 8 | P 37 09 599.4 | A1 | 45 | B3 | 20 | C1 | 5 | — | — | E1 | 30 |
| 9 | P 37 09 599.4 | A1 | 45 | B3 | 20 | C2 | 5 | — | — | E1 | 30 |
| Invention | | | | | | | | | | | |
| 10 | | A2 | 60 | — | — | — | — | D1 | 40 | (A2 contains 50% by weight E1) | |
| 11 | | A2 | 60 | — | — | — | — | D2 | 40 | (A2 contains 50% by weight E1) | |
| 12 | | A2 | 60 | — | — | C1 | 5 | D1 | 35 | (A2 contains 50% by weight E1) | |
| 13 | | A2 | 60 | — | — | C2 | 5 | D1 | 35 | (A2 contains 50% by weight E1) | |

| | E-modulus in bending [MPa] | | $a_n$* (RT) [kJ/m$^2$] | | Dielectric strength [kV/mm] | | |
|---|---|---|---|---|---|---|---|
| Compound no. | (fm) | (cond.) | (fm) | (cond.) | (RT) | (70° C.) | (100° C.) |
| Comparison | | | | | | | |
| 1 | 8250 | 4800 | 75 | 84 | 45.3 | 28.1 | 13.1 |
| 2 | 4650 | 1530 | 82 | 160 | 44.3 | 18.5 | 9.4 |
| 3 | 8600 | 6100 | 34 | 46 | 49.2 | 36.2 | 20.5 |
| 4 | 8530 | 5920 | 37 | 49 | 48.9 | 36.9 | 20.9 |
| 5 | 8480 | 6000 | 40 | 53 | 59.0 | 37.1 | 21.2 |
| 6 | 8300 | 5870 | 45 | 57 | 50.8 | 36.7 | 22.0 |
| 7 | 5040 | 2500 | 35 | 81 | 50.1 | 34.9 | 20.6 |
| 8 | 8050 | 6250 | 55 | 66 | | | |
| 9 | 8310 | 6370 | 64 | 71 | | | |
| Invention | | | | | | | |
| 10 | 7900 | 6050 | 50 | 76 | 50.3 | 35.9 | 20.5 |
| 11 | 8200 | 6240 | 73 | 85 | 48.7 | 34.3 | 20.0 |
| 12 | 7880 | 5810 | 63 | 75 | | | |
| 13 | 8030 | 5300 | 82 | 88 | | | |

*Izod impact strength;
RT = room temperature;
fm = freshly molded;
cond. = conditioned Compared with reinforced and filled polyamides (compounds 1, 2), the molding compounds according to the invention (compounds 10 to 13) show improved electrical properties and rigidity, particularly after conditioning. Compared with molding compounds produced in accordance with P 37 09 599.4 (compounds 4 to 9), the molding compounds according to the invention are distinguished by improved toughness, good electrical properties and high rigidity, even after conditioning, and have particularly smooth surfaces.

We claim:

1. Filled and/or reinforced thermoplastic molding compositions having an improved surface and improved mechanical or electrical properties which comprise:
  (AE) at least 10% by weight polyamides (A) which contains from 10 to 65% by weight fillers and/or reinforcing materials (E),
  (C) from 0 to 30% by weight based, on the sum of (A+C+D), of rubber polymers as high impact modifiers, and
  (D) from 10 to 60% by weight interpolymers consisting of from 40 to 80% by weight of amorphous or partially crystalline polyamides (A) and
    (B) from 20 to 60% by weight of thermoplastic copolymers or mixtures of several thermoplastic copolymers of
      (B1) at least 15% by weight of at least one monomer selected from the group consisting of
        (B1.1) styrenes and α-methylstyrenes which are unsubstituted or substituted by alkyl, haloalkyl or halogen, and
        (B1.2) from 0 to 50% by weight of other monomers selected from the group consisting of acrylonitrile, methacrylonitrile, vinyl-$C_{14}$-carboxylic acids and acryl ester which are esters of acrylic or methacrylic acids with primary secondary $C_{1-10}$ alcohols, and
      (B2) from 0.5 to 35% by weight of at least one ester of acrylic or methacrylic acid with tertiary $C_{4-10}$ alcohols,
  prepared by homogenization of component (B) with polyamide (A) in the melt in mixing or kneading units.

2. Molding compounds as claimed in claim 1, characterized in that they consist of 20 to 60% by weight interpolymer (D) in the interpolymer component (D).

3. Molding compounds as claimed in claim 1, characterized in that the polyamides (A) contain 15 to 60% by weight of fillers and/or reinforcing materials (E).

4. Molding compounds as claimed in claim 1, characterized in that they contain 5 to 20% by weight of rubber polymers as high-impact modifiers.

5. Molding compounds as claimed in claim 1, characterized in that they consist of 25 to 75% by weight polyamide (A) containing 15 to 60% by weight, based on polyamide (A), of fillers and/or reinforcing materials (E), 20 to 60% by weight interpolymer (D) and 5 to 15% by weight rubber polymers (C).

6. Molding compounds as claimed in claim 1, characterized in that the interpolymer (D) consists of 50 to 75% by weight partially crystalline polyamides and of 25 to 50% by weight thermoplastic copolymers or mixtures of several thermoplastic copolymers.

7. Molding compounds as claimed in claim 1, characterized in that the thermoplastic copolymer (B1) consists of at least 30% by weight styrene and 20 to 40% by weight of other monomers from the group consisting of acrylonitrile, methacrylonitrile, vinyl-$C_{1-4}$-carboxylic acids and esters of acrylic or methacrylic acid with the primary or secondary $C_{1-10}$ alcohols; and (B2) 1.5 to 15% by weight of at least one ester of acrylic or methacrylic acid with tertiary $C_{4-10}$ alcohols.

8. Molding compositions as claimed in claim 1 wherein (D) contains 50 to 75% by weight of polyamide.

9. Molding compositions as claimed in claim 1 wherein (D) contains from 25 to 50% by weight of copolymers (B).

10. Molding compositions as claimed in claim 1 wherein copolymers (B) contain at least 30% by weight of (B1).

11. Molding compositions as claimed in claim 1 wherein copolymers (B) contain at least 45% by weight of (B1).

12. Molding compositions as claimed in claim 1 wherein copolymers (B) contain in component (B1) 10 to 50% by weight of B1.2).

13. Molding compositions as claimed in claim 1 wherein copolymers (B) contain in component (B1) 20 to 40% by weight of B1.2).

14. Molding compositions as claimed in claim 1 wherein copolymers (B) contain 1 to 20% by weight of (B2).

15. Molding compositions as claimed in claim 1 wherein copolymers (B) contain 1.5 to 15% by weight of (B2).

16. A process for the production of the filled and/or reinforced thermoplastic molding compounds having an improved surface and improved mechanical or electrical properties of at least 10% by weight polyamide composition (AF) containing 15 to 60% by weight, based on AF), of fillers and/or reinforcing materials, 0 to 30% by weight rubber polymers (C) as high-impact modifiers and (D) 10 to 60% by weight interpolymer (D) which is 40 to 80% by weight partially crystalline or amorphous polyamides and
(B) 20 to 60% by weight thermoplastic copolymers or mixtures of several thermoplastic copolymers of
(B1) at least 15% by weight of at least one monomer from the group consisting of
(B1.1) styrenes and -methylstyrenes which may also be alkyl-, haloalkyl- and/or halogen-substituted
and
(B1.2) 0 to 50% by weight of other monomers selected from the group consisting of acrylonitrile, methacrylonitrile, vinyl-$C_{14}$-carboxylic acids and esters of acrylic or methacrylic acids with primary or secondary $C_{1-10}$ alcohols,
(B2) 0.5 to 35% by weight of at least one ester of acrylic or metacrylic acid with tertiary $C_{4-10}$ alcohols
prepared by homogenization in the melt in standard mixing or kneading machines wherein components AE), (D) and (C) are extruded to form moldings.

* * * * *